United States Patent [19]
Cutler

[11] Patent Number: 6,029,597
[45] Date of Patent: Feb. 29, 2000

[54] LIGHTNING DISCHARGE STRIP

[76] Inventor: James Cutler, 99 Chestnut Hill, Killingworth, Conn. 06419

[21] Appl. No.: 09/339,355

[22] Filed: Jun. 24, 1999

[51] Int. Cl.⁷ ........................................................ B63B 8/00
[52] U.S. Cl. .............................................. 114/343; 174/2
[58] Field of Search ................................ 174/2; 361/218; 204/196.18, 196.21; 114/343, 221 R

[56] References Cited

U.S. PATENT DOCUMENTS

| | | |
|---|---|---|
| 11,217 | 7/1854 | Forbes ........................................ 114/90 |
| 20,877 | 7/1858 | Haskins ................................. 114/65 R |
| 3,919,956 | 11/1975 | Invernizzi . |
| 4,915,053 | 4/1990 | Goodwin ................................... 114/343 |
| 5,036,785 | 8/1991 | Kittredge, Jr. et al. . |

*Primary Examiner*—Ed Swinehart
*Attorney, Agent, or Firm*—Bachman & LaPointe, P.C.

[57] ABSTRACT

The present invention relates to a lightning protection device comprising a ground plate having a plurality of parallel grooves machined therein. Each of the grooves has spaced apart, sharp edges for bleeding electrical discharges from a lightning strike to ground. The ground plate may be connected to an air terminal secured to a structure or a marine vessel via a down conductor. The ground plate may be buried in the ground or may be joined to a structure, such as the hull of the vessel.

22 Claims, 2 Drawing Sheets

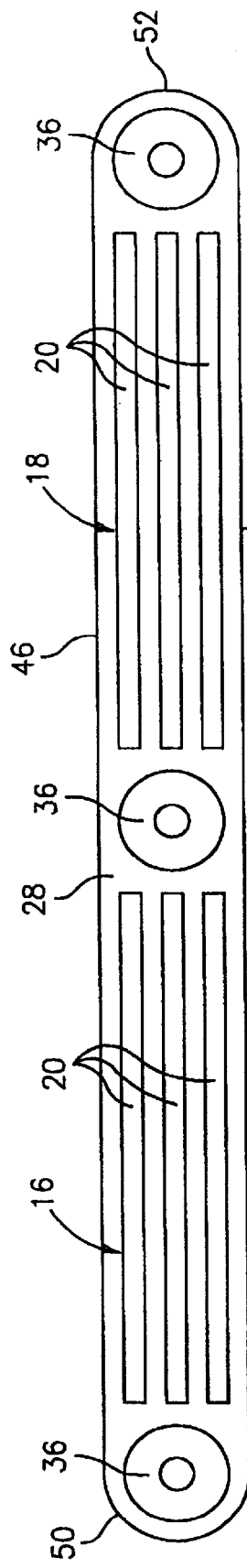
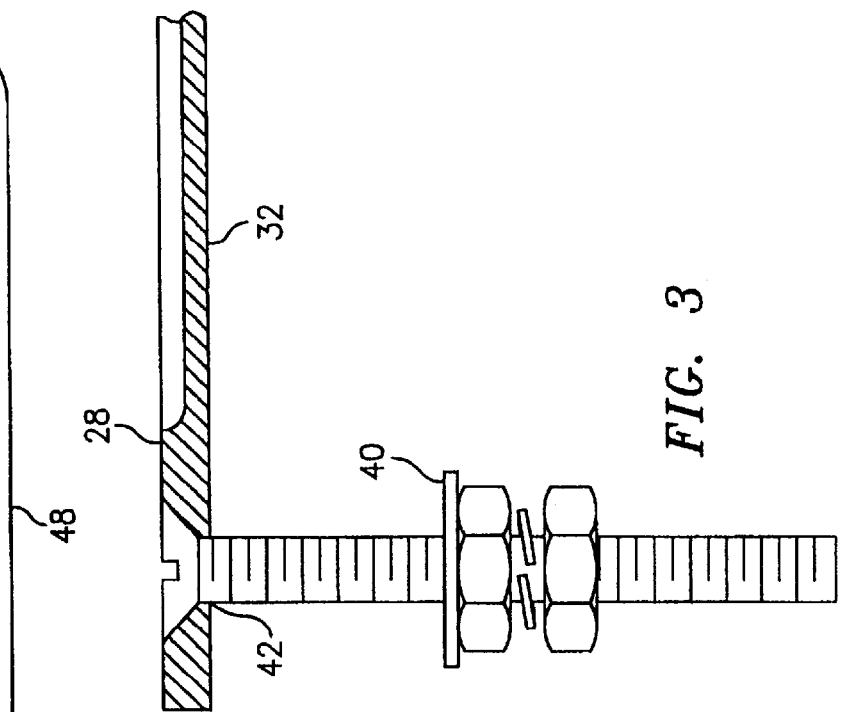
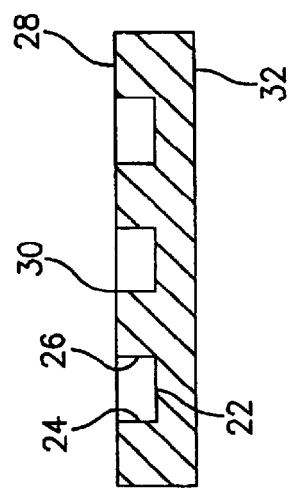
FIG. 1
FIG. 2
FIG. 3

LIGHTNING DISCHARGE STRIP

BACKGROUND OF THE INVENTION

The present invention relates to a lightning protection device in the form of a discharge strip for dissipating the effects of a lightning strike. The lightning protection device of the present invention has particular utility with ships, boats, and other marine vessels.

Lightning strikes are very dangerous natural phenomena. The high voltage electrical discharges associated with them can cause significant damage to structures and to marine vessels such as recreation boats and the like. In extreme situations, they can cause fires capable of destroying such structures and vessels. The strikes can also cause substantial injury, and potentially death, to individuals.

Marine vessels are susceptible to lighting strikes because of the masts and radio antennas normally used in boating. The masts and antennas are points of incipient receipt of lightning strikes, which strikes can cause serious damage to sensitive and important electrical equipment onboard the vessels. In the absence of efficient, economical, and reliable lightning strike protection, owners are reluctant to venture out onto open waters whenever there is even a slight possibility of thunderstorms.

A number of attempts have been made to produce effective lighting protection devices which discharge the electrical potential carried by a lightning strike to ground. U.S. Pat. No. 5,036,785 to Kittredge, Jr. et al. illustrates a lightning protection installation for a boat comprising a copper lightning rod mounted on the top of the mast, or in the case of a power boat, mounted on the deck, a copper wire attached to the rod and running downwardly to a point where it is attached to a retractable copper conductor. The copper conductor is retractable through a plastic of fiberglass tube or box molded or inserted in the hull or attached to a centerboard, if available. When the conductor is raised to the passive position, it is protected from the formation of marine growth; and when it is lowered, the conductor provides sufficient wettable electrical conducting grounding surface to conduct the lightning to water ground.

U.S. Pat. No. 3,919,956 to Invernizzi relates to a lightning protection installation comprising a lightning rod which is grounded by an inner conducting core of a coaxial cable having a grounded outer conducting sheath separated from the core by an insulating layer. The lightning rod may be connected to a ground plate by the conductor core.

Despite the existence of such lightning protection devices, there still remains a need for an inexpensive, easy to install lightning protection device.

SUMMARY OF THE INVENTION

Accordingly, it is an object of the present invention to provide a lightning protection device which may be used in a wide variety of environments.

It is a further object of the present invention to provide a lightning protection device which is relatively inexpensive to produce and easy to install.

It is yet a further object of the present invention to provide a lightning protection device which has particular utility with marine vessels.

The foregoing objects are attained by the lightning protection device of the present invention.

In accordance with the present invention, the lightning protection device comprises a ground plate having a plurality of parallel grooves machined therein. Each of the grooves has spaced apart, sharp edges for bleeding electrical discharges from a lightning strike to ground. The ground plate may be connected to an air terminal rod secured to a structure or vessel via a down conductor. The ground plate may be buried in the ground or may be joined to a structure, such as the hull of a marine vessel.

Other details of the lightning protection device, as well as other advantages and objects attendant thereto, are set forth in the following detailed description and the accompanying drawings, in which like reference numerals depict like elements.

BRIEF DESCRIPTION OF THE DRAWINGS

FIG. 1 is a top view of a ground plate in accordance with the present invention;

FIG. 2 is a sectional view of the ground plate of FIG. 1 taken along lines 2—2;

FIG. 3 is a sectional view of the ground plate of FIG. 1 taken along lines 3—3;

DETAILED DESCRIPTION OF THE PREFERRED EMBODIMENT(S)

Figure 5:
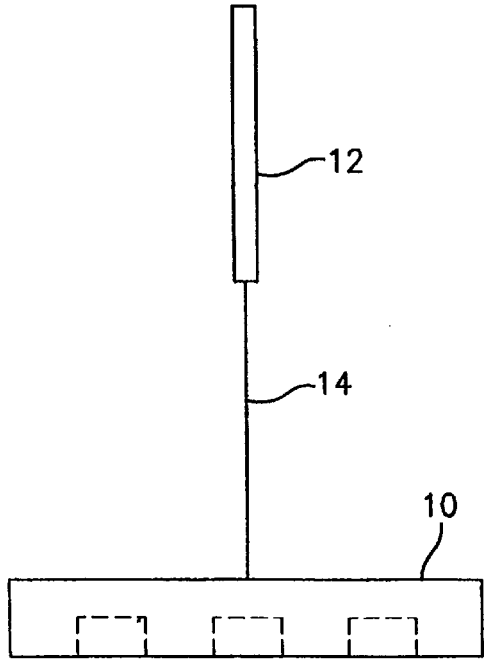
FIG. 5 is a schematic representation of a lightning protection system employing the ground plate of FIG. 1.

Referring now to the drawings, FIGS. 1–3 illustrate a first embodiment of a ground plate 10 in accordance with the present invention to be used in a lightning protection system. As shown in FIG. 5, the lightning protection system includes an air terminal 12, such as a lightning rod, connected to the ground plate 10 via a down conductor 14. The air terminal 12 may comprise any suitable device known in the art and may be mounted to a structure such as a house, a high rise building, etc. When used on a marine vessel, the air terminal 12 may be connected to the mast, if the vessel has one, or some other high point thereon. The down conductor 14 may comprise any suitable electrical conductor known in the art. For example, it could be the conductor shown in U.S. Pat. No. 3,919,956, which is incorporated by reference herein. In a preferred embodiment of the lightning protection system of the present invention, the down conductor 14 extends in a relatively straight manner from the air terminal 12 to the plate 10. The down conductor 14 may be connected to the plate 10 in any suitable manner known in the art, such as a compression connector or a pressure connector.

The ground plate 10 is preferably formed from copper or a copper alloy such as alloy C110. While this is a preferred material, the ground plate 10 could be formed from other conductive metals or metal alloys. The metal or metal alloy used for the ground plate 10 would of course depend upon the intended environment for the ground plate.

As shown in FIG. 1, the ground plate 10 has two side walls 46 and 48 and rounded edges 50 and 52. The plate 10 also preferably has two sets 16 and 18 of grooves 20 machined therein with the grooves being spaced apart by a distance sufficient to avoid electrical charges from causing boiling therebetween. As shown in FIG. 2, each groove 20 in this first embodiment has a bottom wall 22 and two substantially vertical walls 24 and 26. The upper ends of the walls 24 and 26 meet the substantially planar upper surface 28 of the plate 20. The junction of the upper end of the each wall 24 and 26 and the surface 28 should be as close as possible to a 90 degree or right angle. By creating such a junction, it has been found that very advantageous sharp edges 30, which form an infinite number of points for discharge of a lightning charge to ground, can be formed.

As can be seen from FIG. 2, the ground plate 10 has a substantially planar, substantially solid lower surface 32 for facilitating the mounting of the ground plate 10 to a structure such as boat hull 34. The ground plate 10 also has a plurality of spaced apart apertures or counter-sunk holes 36 to facilitate its mounting to a structure. The apertures or holes 36 may be designed to receive any suitable fastening device known in the art.

When the ground plate 10 is to be mounted to a boat hull, a plurality of threaded bolts or screws 38 may be used to join the plate to the hull. Since the bolts or screws 38 will be exposed to the marine environment, it is desirable to cover the bolts or screws with a brazing material, such as a silver braze, to prevent corrosion which leads to the creation of high resistance junctions. If desired, each aperture 36 may be provided with an outwardly angled break 42 to facilitate accommodation of the brazing material. Since the plate 10 is formed from copper or a copper alloy, it does not have to be covered with a brazing material.

As shown in FIG. 3, a washer and nut member 40 may be threaded onto the bolt or screw 38 to complete the mounting. The washer and nut member 40 may comprise any suitable washer and nut arrangement known in the art.

Figure 4:
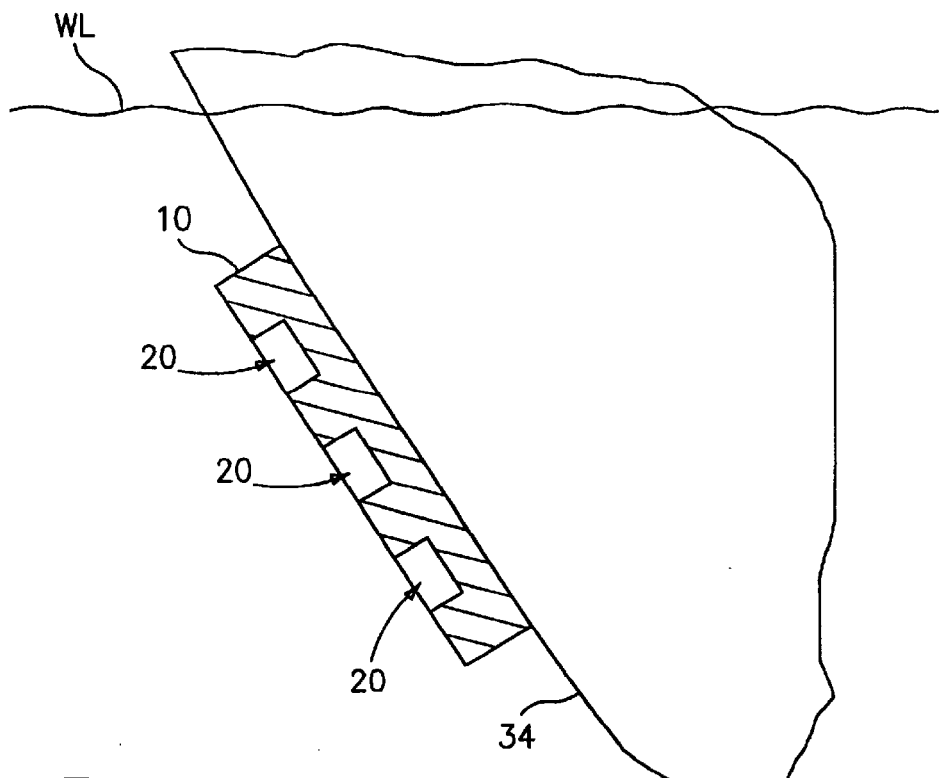
FIG. 4 is a schematic representation of the ground plate of FIG. 1 mounted to the hull of a marine vessel.

Referring now to FIG. 4, the ground plate 10 is mounted to the boat hull 34 beneath the waterline WL. This allows dissipation of any electrical charge from the ground plate 10 to the water. In most installations, the ground plate 10 may be mounted directly to the boat hull. An insulating plate is not required because in many applications the hull is formed from an electrically non-conductive material. As previously discussed, the ground plate 10 is joined to an air terminal via a down conductor.

Figure 6:
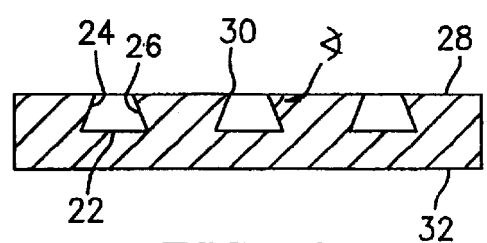
FIG. 6 illustrates an alternative embodiment of a ground plate in accordance with the present invention.

Referring now to FIG. 6, a second embodiment of a ground plate 10 in accordance with the present invention is illustrated. In this embodiment, the edges 30 of the grooves 20 are defined by sidewalls 24 and 26 angled at an acute angle of less than 90° with respect to the upper surface 28 of the plate 10. As a result of the use of angled sidewalls, the edges 30 are very sharp and should provide excellent discharge to ground of a lightning charge.

It should be recognized that while the ground plate 10 may be mounted to the hull of a marine vessel, it could be used in a lightning protection system where the ground plate 10 is buried in the ground. In such a system, the ground plate 10 is preferably oriented so that the grooves 20 face downwardly.

The ground plate 10 of the present invention makes advantageous use of edge technology to dissipate electrical charges caused by lightning strikes. By creating sharp edges 30, the electrical charge bleeds off to the ground or water without any heating. If the edges 30 were rounded, heating would be created which can cause severe problems.

While the ground plate 10 has been illustrated as having two sets of grooves, it should be apparent that it could be provided with more than two sets of grooves if desired. Alternatively, the ground plate 10 could be provided with a single set of parallel grooves.

It is apparent that there has been provided in accordance with the present invention, a lightning discharge strip which fully satisfies the objects, means and advantages set forth hereinbefore. While the present invention has been described in the context of specific embodiments thereof, other alternatives, variations, and modifications will be apparent to one of skill in the art after reading the description. It is intended to embrace such alternatives, modifications, and variations as fall within the broad scope of the appended claims.

What is claimed is:

1. A lightning protection device comprising:

a ground plate;

said ground plate having a plurality of parallel grooves machined therein; and each of said grooves having spaced apart edges for bleeding electrical discharges from a lightning strike to ground.

2. A lightning protection device according to claim 1, further comprising:

said plate having a substantially planar upper surface;

each of said grooves having a bottom wall and a pair of side walls joined to said bottom wall; and said spaced apart edges being formed by respective sidewalls joining said substantially planar upper surface at an angle of 90° or less, whereby a plurality of sharp edges for dissipating electrical charges to the ground are formed.

3. A lightning protection device according to claim 2, wherein said side walls are at a right angle to said upper surface.

4. A lightning protection device according to claim 2, wherein said side walls each form an acute angle with said upper surface.

5. A lightning protection device according to claim 1, further comprising said grooves being spaced apart by a distance sufficient to avoid boiling between adjacent grooves.

6. A lightning protection device according to claim 1, wherein said plurality of parallel grooves comprises a first set of parallel grooves and a second set of parallel grooves spaced along the length of the ground plate.

7. A lightning protection device according to claim 1, further comprising means for joining said ground plate to an object.

8. A lightning protection device according to claim 7, wherein said joining means comprises a plurality of apertures in said ground plate and means for securing said plate to said object.

9. A lightning protection device according to claim 8, wherein said securing means comprising a plurality of bolts each having a brazing coating to prevent against corrosion.

10. A lightning protection device according to claim 1, wherein said ground plate is formed from copper or a copper alloy.

11. A lightning protection device according to claim 7, wherein said object comprises a hull of a marine vessel.

12. A lightning protection device according to claim 1, wherein said plate is buried in the ground.

13. A lightning protection device according to claim 1, further comprising an air terminal connected to said ground plate by a down conductor.

14. A lightning protection device according to claim 13, wherein said down conductor comprises a relatively straight conductor formed from an electrically conductive material.

15. A lightning protection device according to claim 1, wherein said ground plate has a substantially planar lower surface.

16. A lightning protection system for a marine vessel having a hull, said lightning protection system comprising:

a ground plate secured to the hull at a location beneath the waterline;

said ground plate having a plurality of parallel grooves machined therein; and each of said grooves having spaced apart edges for dissipating an electrical charge from a lightning strike to water.

17. A lightning protection system for a marine vessel according to claim 16, further comprising:

an air terminal secured to said marine vessel; and a down conductor for electrically connecting said air terminal to said ground plate.

18. A lightning protection system for a marine vessel according to claim 16, further comprising:

said plate having a substantially planar upper surface;

each of said grooves having side walls; and said spaced apart edges being sharp and being formed by said side walls meeting said substantially planar upper surface at an angle of 90° or less.

19. A lightning protection system for a marine vessel according to claim 16, further comprising:

a plurality of apertures in said ground plate for allowing said ground plate to be mounted to said boat hull; and a plurality of bolts for joining said ground plate to said boat hull via said apertures, each of said bolts having a brazing for preventing water corrosion.

20. A lightning protection system for a marine vessel according to claim 16, wherein said plate is formed from copper or a copper alloy.

21. A lightning protection system for a marine vessel according to claim 16, wherein:

said plate has a first set of parallel grooves and a second set of parallel grooves spaced from said first set of parallel grooves;

said plate has a plurality of apertures for allowing said plate to be mounted to said hull; and at least one of said apertures being positioned between said first and second sets of parallel grooves.

22. A lightning protection system for a marine vessel according to claim 16, wherein said plate has rounded end edges connected by straight sidewalls and a substantially planar, solid lower surface.

* * * * *